United States Patent
Bailey et al.

(10) Patent No.: US 9,781,130 B1
(45) Date of Patent: Oct. 3, 2017

(54) MANAGING POLICIES

(75) Inventors: Daniel V. Bailey, Pepperell, MA (US); Lawrence N. Friedman, Arlington, MA (US); Riaz Zolfonoon, Concord, MA (US); Yedidya Dotan, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/536,999

(22) Filed: Jun. 28, 2012

(51) Int. Cl.
*G06F 15/173* (2006.01)
*H04L 29/06* (2006.01)
*G06F 21/44* (2013.01)
*G06F 21/55* (2013.01)
*H04W 12/06* (2009.01)
*H04L 9/32* (2006.01)

(52) U.S. Cl.
CPC ............ *H04L 63/107* (2013.01); *G06F 21/44* (2013.01); *G06F 21/552* (2013.01); *H04L 9/3271* (2013.01); *H04L 9/3297* (2013.01); *H04W 12/06* (2013.01); *G06F 2221/2111* (2013.01); *G06F 2221/2151* (2013.01); *H04L 2209/80* (2013.01)

(58) Field of Classification Search
CPC ........................ H04L 63/107; G06F 2221/2111
USPC ......................................... 709/223–225, 229
See application file for complete search history.

(56) References Cited

U.S. PATENT DOCUMENTS

| | | | |
|---|---|---|---|
| 6,308,273 B1* | 10/2001 | Goertzel | G06F 21/6218 726/2 |
| 7,805,449 B1* | 9/2010 | Bone et al. | 707/751 |
| 7,890,626 B1* | 2/2011 | Gadir | G06F 11/2023 709/223 |
| 8,112,785 B1* | 2/2012 | Cooley et al. | 726/1 |
| 2008/0271109 A1* | 10/2008 | Singh | H04L 63/08 726/1 |
| 2009/0287627 A1* | 11/2009 | Van Elburg | 706/47 |
| 2012/0303827 A1* | 11/2012 | Neystadt et al. | 709/229 |
| 2013/0052990 A1* | 2/2013 | Zhang | 455/411 |
| 2013/0067044 A1* | 3/2013 | Levy-Yurista et al. | 709/220 |
| 2013/0217331 A1* | 8/2013 | Manente | 455/41.2 |

* cited by examiner

Primary Examiner — Brian J Gillis
Assistant Examiner — Austin Moreau
(74) Attorney, Agent, or Firm — Krishnendu Gupta; Jason A. Reyes

(57) ABSTRACT

A method, system and computer program product for use in managing policies is disclosed. Policies associated with a communications device are correlated with respective locations. The location of the communications device is determined. The policy correlated with the determined location is applied to the communications device.

3 Claims, 3 Drawing Sheets

MANAGING POLICIES

RELATED APPLICATION

This application is a continuation-in-part application claiming priority to co-pending U.S. patent application Ser. No. 13/435,951, filed Mar. 30, 2012, reference no. EMC-12-028, entitled "AUTHENTICATING AN ENTITY IN CONNECTION WITH A COMPUTERIZED RESOURCE", the entirety of which patent application is hereby incorporated by reference herein.

TECHNICAL FIELD

The present invention relates to managing policies.

BACKGROUND OF THE INVENTION

It will be appreciated that wireless communications devices such as smartphones are often subject to a number of different policies. For example, a smartphone may be configured such that personal policies apply in connection with a smartphone. Additionally, the smartphone may be configured to access a corporate network in which case corporate policies may also apply in connection with the smartphone. Furthermore, there may be other policies such as those associated with state and/or national laws which may also apply in connection with the smartphone. It will be appreciated that these policies may periodically conflict with each other.

SUMMARY OF THE INVENTION

A method, system and computer program product for use in managing policies is disclosed. Policies associated with a communications device are correlated with respective locations. The location of the communications device is determined. The policy correlated with the determined location is applied to the communications device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
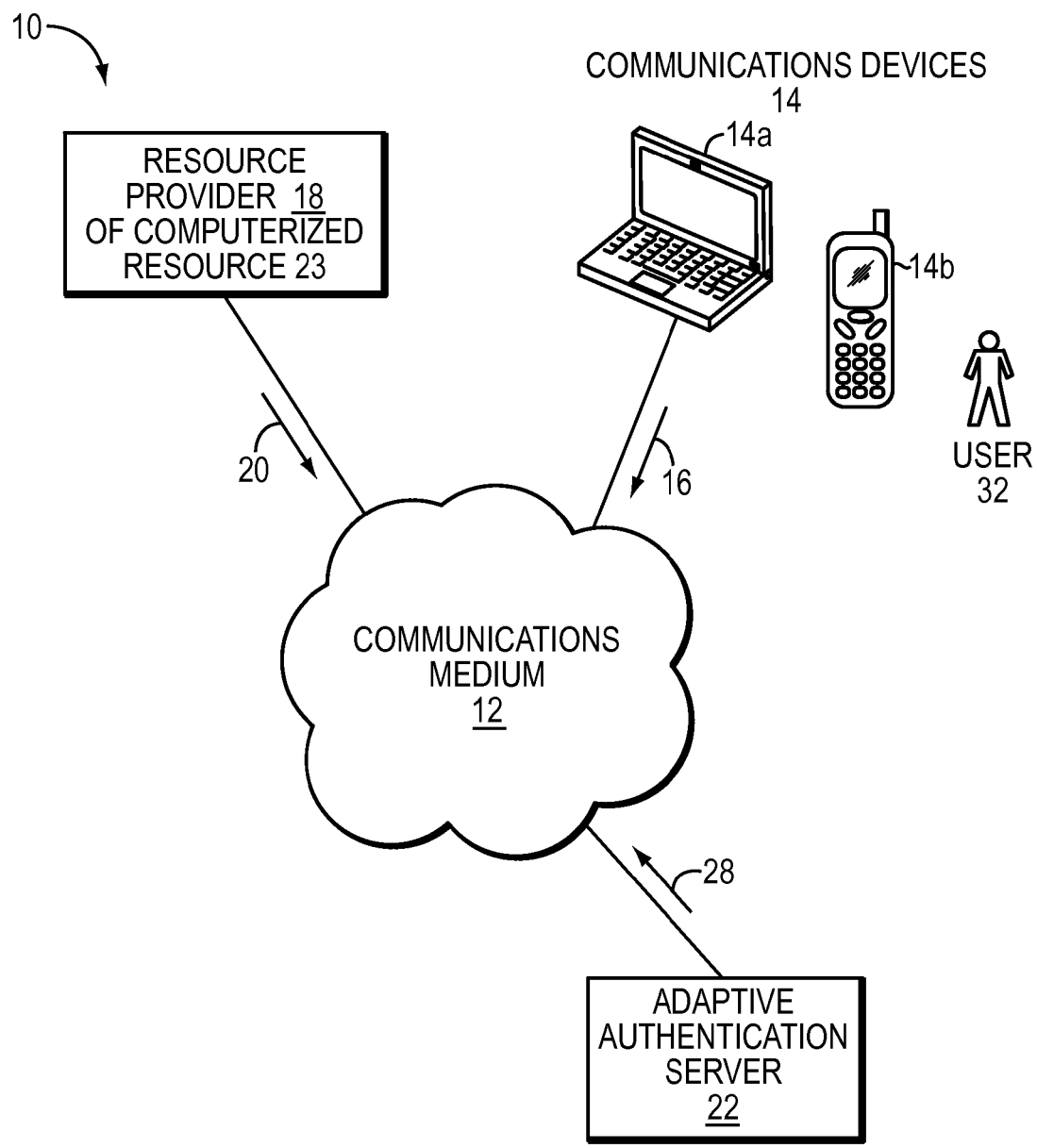
FIG. 1 is a diagram illustrating an example environment for implementing the technique as described herein.

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There is disclosed a method, system and computer program product for use in managing policies. In this embodiment, the technique as disclosed herein can selectively apply policies to a communications device based on the location of the communications device. It will be understood that there may be a plurality of policies with some associated with legislation applicable in various states or regions or countries. However, it will be evident that there is no need to adhere to, for example, European Union legislation when the communications device is located in the United States. It will be appreciated that policies associated with legislation in the United States should take precedence in response to the communications device being located in the United States. Furthermore, it will be understood that such a policy associated with legislation in the United States should also take precedence over corporate policy in response to the communications device being located in the United States. It will be evident that legal requirements must take precedence over corporate policies.

It will be further appreciated that in other embodiments the technique can apply corporate policies to a communications device based on the communications device being located in a work environment. It will be appreciated that other policies may be applied to the communications device in an environment outside of work such as a home environment. It will be understood from the foregoing that there may be a plurality of discrete policies in connection with the communications device. The above are some of the examples only.

Referring to FIG. 1, there is illustrated an example environment 10 for implementing the technique of managing policies as described herein. The environment 10 comprises communications devices 14, a communications medium 12, a resource provider 18 and an adaptive authentication server 22.

The communications devices 14 may comprise smartphones, personal digital assistants, laptop computers, desktop computers, tablet computers, cameras, MP3 players, portable game systems, and the like. However, it will be understood that the communications devices 14 are not limited to such devices as listed above but include all devices with communications capabilities. The communications devices 14 may be constructed and arranged to submit a request such as an authentication request 16 to the resource provider 18 via the communications medium 12 which then delegates the task to the adaptive authentication server 22. However, it will be appreciated that in some embodiments the authentication request 16 may be sent direct to the adaptive authentication server 22 over the communications medium 12 rather than indirectly through the resource provider 18. It will also be appreciated that the authentication request may comprise an identifier in order to facilitate identification.

It will be understood that an entity such as a user 32 may comprise a plurality of communications devices such as a laptop computer 14*a* and a smartphone 14*b* for facilitating access to the resource provider 18 via the communications medium 12. It will be understood that the laptop computer 14*a* and the smartphone 14*b* may also have position determining functionality such as GPS for determining the location of the respective devices.

The communications medium 12 provides network connections between the communications devices 14, the resource provider 18 and the adaptive authentication server 22. The communications medium 12 can implement a variety of protocols such as TCP/IP, UDP, ATM, Ethernet, Fibre Channel, combinations thereof, and the like. Furthermore, the communications medium 12 can include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

The resource provider 18 can provide the user 32 of the communications devices 14 with access to one or more computerized resources 23 following successful user authentication. An example of a suitable resource provider 18 is a data storage array which provides secure access to files, directories, volumes, LUNs, etc. Another example of a suitable resource provider 18 is a web server which provides secure access to various web pages. Yet another example of a suitable resource provider 18 is a server which provides secure user account and/or transactional access such as that for an online banking site, an online store, an online gaming site, and so on. Other types of resource providers are suitable for use as well.

The adaptive authentication server 22 as will be described in further detail below is configured to receive an authentication request 20 from the resource provider 18 over the communications medium 12. It will be appreciated from the foregoing that the adaptive authentication server 22 may in some embodiments receive the authentication request direct from the user device 14. In either embodiment, the authentication request is sent to the adaptive authentication server 22 in order to authenticate the identity of the user 32 by performing risk-based authentication.

It will also be understood that in this embodiment the adaptive authentication server 22 may store in memory of the server 22 the details associated with the user for facilitating authentication. In one embodiment, there may be stored a username and/or password. In a further embodiment, a location history in connection with the communications device 14*b* may be stored which will be understood to emulate the location of the user 32. It will be appreciated that in such an embodiment that the adaptive authentication server 22 may be configured for performing risk-based assessment by determining the current location of the mobile communications device 14*b* and performing an analysis between the current location and the location history for facilitating authentication. It will be still further understood that the adaptive authentication server 22 is constructed and arranged to send an adaptive authentication result 28 to the resource provider 18 via the communications medium 12 on completion of the risk based authentication in the server 22 in order to grant or deny authentication to the computerized resource 23.

It will also be understood that in this embodiment the adaptive authentication server 22 may store in memory of the server 22 a plurality of policies associated with the communications devices. It will be further understood that the policies may be correlated with respective locations. These policies may be referred to as location-based policies. For example, there may be policies associated with legislation in a region and these policies may be correlated with the location of the region. In a further example, there may be corporate policies applicable to a work environment, which are correlated with the location of the work environment, and other policies associated with the location outside of the work environment. In this embodiment, the policies and correlated locations can be manually entered into memory by an administrator of the server 22.

It will be further understood that the adaptive authentication server 22 is configured for applying a policy to the communications device in response to determining the location of the communications device whereby the policy applied to the communications device is correlated with the determined location. It will be appreciated that in this embodiment the policy may be applied in response to authentication being granted. For example, the policy may be associated with legislation in a particular region which is to be applied to the communications device in response to determining the device in the region. It will be still further understood that the adaptive authentication server 22 is constructed and arranged to apply the policy to the communications device at substantially the same time as sending the result 28 to the resource provider 18 via the communications medium 12.

Figure 2:
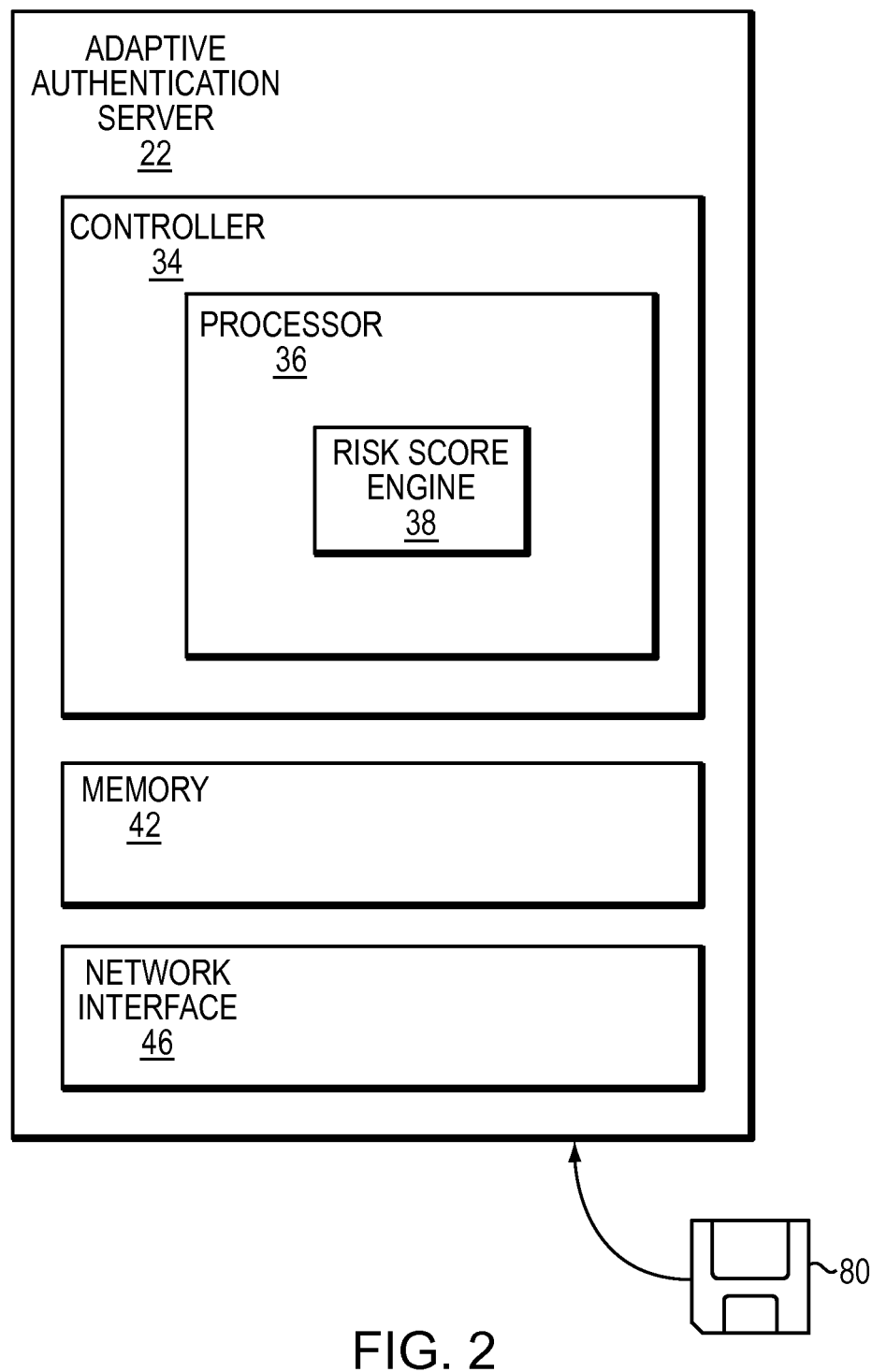
FIG. 2 is a diagram illustrating an example adaptive authentication server within the environment illustrated in FIG. 1.

Referring to FIG. 2, there is illustrated the components of the adaptive authentication server 22. The adaptive authentication server 22 comprising a network interface 46, a memory 42 and a controller 34.

The network interface 46 is constructed and arranged to send and receive data over the communications medium 12. Specifically, in this embodiment, the network interface 46 is configured to receive authentication request 20 from resource provider 18 over communications medium 12 and to send authentication result 28 to the resource provider 18 over communications medium 12.

The memory 42 is configured to store user details and location-based policies. It will be appreciated as discussed previously that an administrator can input the user details and the location-based policies into memory of the adaptive authentication server 22. It will be understood that at least one policy may be associated with state or regional or national legislation and correlated with the region to which the legislation is associated. It will be further understood that at least one of the policies may state that the user can access the computerized resource 23 when the communications device is located in the corporate headquarters. It will be still further understood that a still further policy may indicate that when located outside the corporate headquarters the user can only have limited access to the computerized resource. It will also be appreciated from the foregoing that memory can be configured for storing multiple policies. It will be further appreciated that the database may be updated periodically. The memory 42 generally takes the form of, e.g., random access memory, flash memory or a non-volatile memory.

The controller 34 includes a processor 36 which takes the form of, but is not limited to, Intel or AMD-based MPUs, and can include a single or multi-cores each running single or multiple threads. The processor 36 is coupled to memory 42 and includes a risk score engine 38 constructed and arranged to assign a risk score to an authentication request.

At this point, it should be understood that the controller 34 of the authentication server 22 is capable of being implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product is capable of delivering all or portions of the software. The computer program product 80 has a non-transitory (or non-volatile) computer readable medium which stores a set of instructions which controls one or more controller operations. Examples of suitable computer readable storage media include tangible articles of manufacture and apparatus which store instructions in a non-volatile manner such as CD-ROM, flash memory, disk memory, tape memory, and the like.

Figure 3:
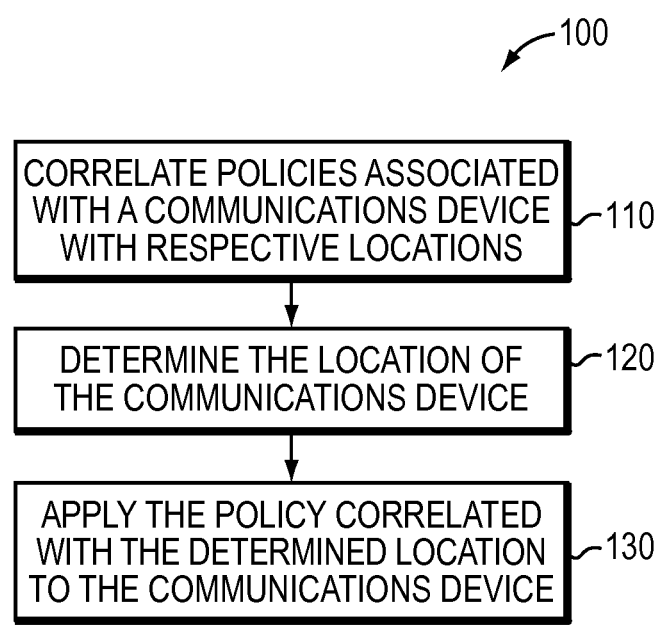
FIG. 3 is a flowchart illustrating an example of the technique for use in managing polices.

Referring to FIG. 3, there is illustrated an example of the technique 100 for use in managing polices. For example, the technique can manage policies in connection with a communications device 14 in an environment 10 substantially similar to that as described above. The technique comprises correlating 110 policies associated with a communications device with respective locations. As mentioned above, the administrator may manually correlate the policies with certain locations and store in memory 42 such that these policies can be applied when the communications device 14 is located at the correlated location. These policies may be referred to as location-based policies. It will be understood by those skilled in the art that such policies can control the operation of the communications device and/or control the amount of data to be accessed by the communications device 14.

The technique comprises determining 120 the location of the communications device 14 by deriving the current location from an input signal comprising the current location of the communications device 14. For example, it will be appreciated that the input signal can be received from the communications device 14 which comprises position determining functionality for determining the location of the device 14. In this embodiment, the communications device 14 can send the input signal over the communications network 12 which is received in the adaptive authentication server 22 by the network interface 46 and stored in memory 42. It will be appreciated that the processor 36 can be configured for deriving the current location of the communications device 14 from the received input signal. It will be further appreciated that in this embodiment the location may be the geolocation co-ordinates in connection with the communications device 14.

In this embodiment, the technique comprises applying 130 the policy correlated with the determined location to the communications device 14. It will be appreciated from the foregoing that the processor 36 can check memory 42 for location-based policies for the determined location. If the processor 36 determines a location-based policy for the location the policy is applied to the communications device 14. In one embodiment, at least one of the policies is associated with legislation applicable to a region. It will be appreciated that in such an embodiment the at least one policy associated with legislation applicable to the region is applied to the communications device 14 in response to determining the communications device in the region. In a further embodiment, at least one of the policies is associated with a work environment. It will be appreciated that the at least one policy associated with the work environment is applied to the communications device 14 in response to determining the communications device in the work environment.

It will be appreciated that in some embodiment the server 22 will receive the input signal comprising the current location of the communications device 14 as well as an authentication request. It will be understood that in such an embodiment an authentication request is received from the user for access to the computerized resource 23. For example, the user 32 may send an authentication request 16 using the communications device to the resource provider 18 of computerized resource 23. The authentication request 16 is sent to the resource provider 18 over the communications medium 12 before the resource provider 18 sends an authentication request 20 to the authentication server 22. It will be understood that the authentication request 20 may be received in the authentication server 22 by the network interface 46.

Additionally, it will be appreciated that an authentication result can be generated for authenticating the user. The generation of the authentication result comprising outputting, as an authentication signal, a risk score based on at least one risk factor. It will be appreciated that in this embodiment the result of the analysis of the username and password or an analysis between the current location of the communications device and the location history may be one of the factors. The risk score may form part of the adaptive authentication result 28 sent to the resource provider 18 via the communications medium 12. In one embodiment, the risk score enables granting of access to the computerized resource in response to the risk score exceeding a predefined threshold and denying access to the computerized resource in response to the risk score not exceeding the predefined threshold. It will be appreciated that if access is granted to the computerized resource the technique will apply 120 the policy correlated with the determined location to the communications device.

It will be appreciated as mentioned above that an analysis can be performed between the current location of the communications device 14 and the location history in order to authenticate the user. However, it will be appreciated that the adaptive authentication server may be configured to also include a user profile which may be combined or form part of the location history in connection with the communications device. For example, if the user has never left the United States, the aforementioned travel detail with respect to the user will be included in the user profile meaning that if the current location of the communications device is in Europe the risk engine will be configured to generate a much higher risk score.

Furthermore, the adaptive authentication server may be configured for recognizing that certain locations are of a greater threat. For example, it will be appreciated that certain countries, or areas within a metropolitan area, tend to be of greater threat than others. The risk engine may be configured to take this into account when generating a risk score. In addition, it will be appreciated that certain countries or areas within a metropolitan area may be transiently subject to additional risk factors. For example, a temporary influx of people may be expected in an area due to a large sporting event, concert or the like. In such a scenario, the server will be configured to generate a higher risk score when there is a temporary influx of people into an area in which the communications device is currently located.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method, comprising:
providing, by processing circuitry, a plurality of policies, including a first policy related to a work location, a second policy related to a non-work location, and a third policy related to a non-visited location;
storing, by processing circuitry, a location history in connection with a user, wherein the location history identifies one or more locations visited by the user and/or one or more locations never visited by the user;
receiving, by processing circuitry, an authentication request originating from the user to access a computerized resource;
determining, by processing circuitry, a current location in connection with the authentication request;
assigning, by processing circuitry, a risk score to the authentication request based on one or more risk factors, wherein the risk factors include a first risk factor based on an analysis of the current location and the location history, wherein the risk factors include a second risk factor based on a determination of whether the current location is associated with a location of a greater threat, wherein the risk factors include a third risk factor based on a determination of whether there has been or will be a temporary influx of people into an area comprising the current location;
selecting, by processing circuitry, one of the plurality of policies based on the current location;
based on the risk score and the selected policy, determining, by processing circuitry, a level of user access to provide to the computerized resource; and
providing, by processing circuitry, user access to the computerized resource in accordance with the said level of user access.

2. A system, comprising:
memory; and
processing circuitry coupled to the memory, the memory storing instructions which, when executed by the processing circuitry, cause the processing circuitry to:
provide a plurality of policies, including a first policy related to a work location, a second policy related to a non-work location, and a third policy related to a non-visited location;
store a location history in connection with a user, wherein the location history identifies one or more locations visited by the user and/or one or more locations never visited by the user;
receive an authentication request originating from the user to access a computerized resource;
determine a current location in connection with the authentication request;
assign a risk score to the authentication request based on one or more risk factors, wherein the risk factors include a first risk factor based on an analysis of the current location and the location history, wherein the risk factors include a second risk factor based on a determination of whether the current location is associated with a location of a greater threat, wherein the risk factors include a third risk factor based on a determination of whether there has been or will be a temporary influx of people into an area comprising the current location;
select one of the plurality of policies based on the current location;
based on the risk score and the selected policy, determine a level of user access to provide to the computerized resource; and
provide user access to the computerized resource in accordance with the said level of user access.

3. A computer program product, the computer program product being embodied in a non-transitory computer readable storage medium and comprising instructions for:
providing a plurality of policies, including a first policy related to a work location, a second policy related to a non-work location, and a third policy related to a non-visited location;
storing a location history in connection with a user, wherein the location history identifies one or more locations visited by the user and/or one or more locations never visited by the user;
receiving an authentication request originating from the user to access a computerized resource;
determining a current location in connection with the authentication request;
assigning a risk score to the authentication request based on one or more risk factors, wherein the risk factors include a first risk factor based on an analysis of the current location and the location history, wherein the risk factors include a second risk factor based on a determination of whether the current location is associated with a location of a greater threat, wherein the risk factors include a third risk factor based on a determination of whether there has been or will be a temporary influx of people into an area comprising the current location;
selecting one of the plurality of policies based on the current location;
based on the risk score and the selected policy, determining a level of user access to provide to the computerized resource; and
providing user access to the computerized resource in accordance with the said level of user access.

* * * * *